(12) United States Patent
Zhu

(10) Patent No.: US 11,467,584 B2
(45) Date of Patent: Oct. 11, 2022

(54) MULTI-LAYER GRID BASED OPEN SPACE PLANNER

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 253 days.

(21) Appl. No.: 16/728,937

(22) Filed: Dec. 27, 2019

(65) Prior Publication Data
US 2021/0200220 A1    Jul. 1, 2021

(51) Int. Cl.
| | |
|---|---|
| G05D 1/02 | (2020.01) |
| G05D 1/00 | (2006.01) |
| H04W 4/40 | (2018.01) |
| H04W 4/02 | (2018.01) |
| G01C 21/34 | (2006.01) |

(52) U.S. Cl.
CPC ....... G05D 1/0212 (2013.01); G01C 21/3453 (2013.01); G05D 1/0088 (2013.01); H04W 4/027 (2013.01); H04W 4/40 (2018.02); G05D 2201/0213 (2013.01)

(58) Field of Classification Search
CPC .............. G05D 1/0212; G05D 1/0088; G05D 2201/0213; H04W 4/40; H04W 4/027; G01C 21/3453
See application file for complete search history.

(56) References Cited

U.S. PATENT DOCUMENTS

| | | | |
|---|---|---|---|
| 8,175,801 B2* | 5/2012 | Tu ................. | G01C 21/3446 701/410 |
| 11,161,246 B2* | 11/2021 | Liu .................. | G01C 21/20 |
| 2021/0020045 A1* | 1/2021 | Huang ............... | B60W 30/10 |

\* cited by examiner

*Primary Examiner* — Peter D Nolan
*Assistant Examiner* — Mikko Okechukwu Obioha
(74) *Attorney, Agent, or Firm* — Womble Bond Dickinson (US) LLP

(57) ABSTRACT

Path planning is performed using a multi-layer grid searching algorithm to position an ADV in a target position. A first layer grid including a first set of nodes is defined. A second layer grid is defined. The second layer grid includes a second set of nodes corresponding to at least a portion of the first set of nodes. From a start node until a goal node, following operations are iteratively performed. A set of next node candidates are identified by searching in the first set of nodes and the second set of nodes. For each next node candidate of the set of next node candidates, a cost is determined using a cost function. A next node having a lowest cost is selected from the set of next node candidates based on their respective costs. A path trajectory of the ADV is generated to position the ADV at the target position.

21 Claims, 11 Drawing Sheets

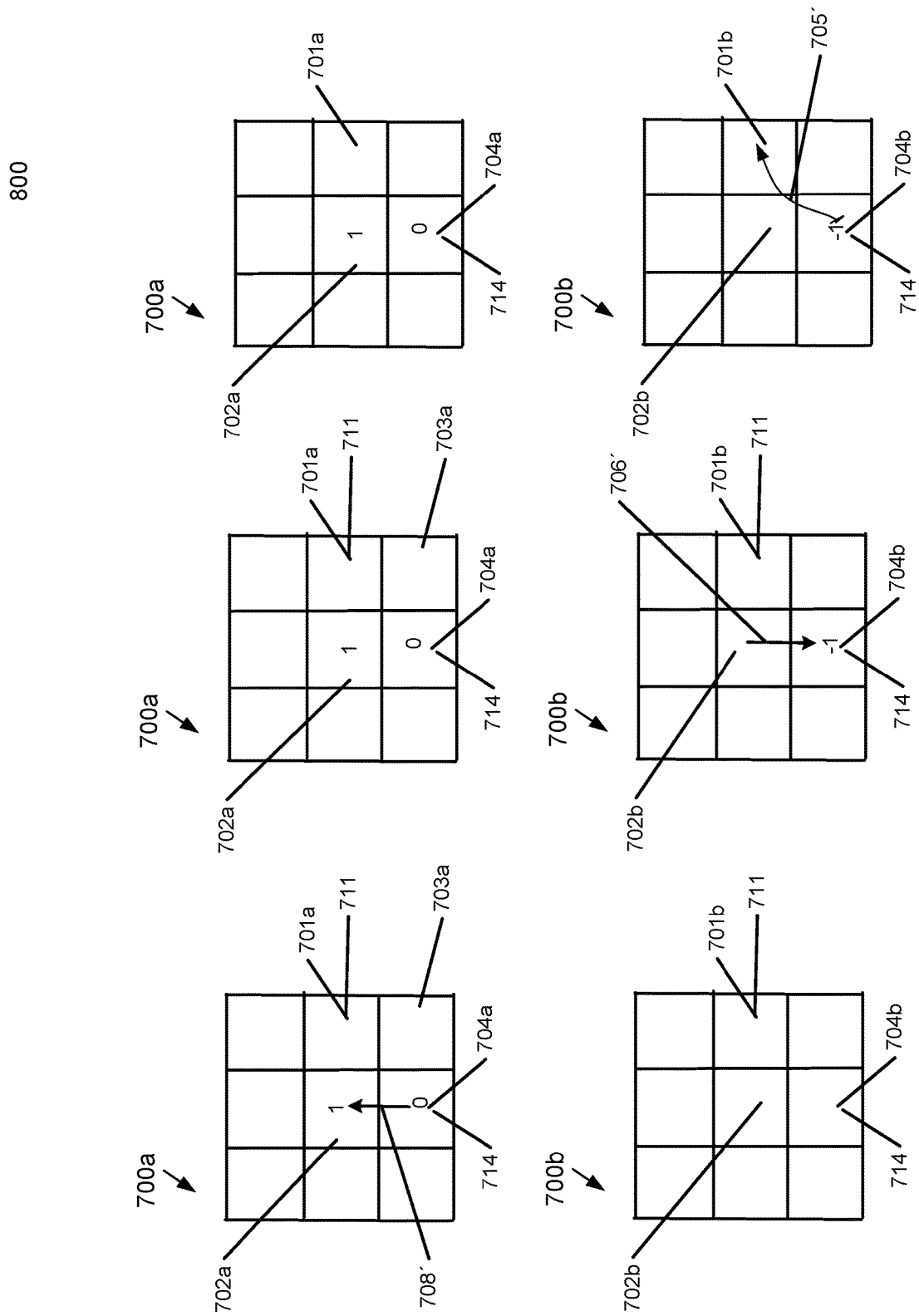

MULTI-LAYER GRID BASED OPEN SPACE PLANNER

TECHNICAL FIELD

Embodiments of the present disclosure relate generally to operating autonomous vehicles. More particularly, embodiments of the disclosure relate to path planning for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Trajectory planning is vital for operating an ADV. In complex scenarios, the ADV needs to make gear shift to drive forward or backward to maneuver to a destination. An open space planner, for example, A-star searching algorithm, may be used to solve parking scenarios. During parking, a last parking position of the ADV is important and usually requires extra attention. However, a trajectory generated by A-star based open space planner may be hard to follow and result in a control error. For example, when parking to a parking slot, A-star searching algorithm may give a solution where a last step is a backward movement with a curve, which may result in a control error, and sometimes may not be acceptable.

BRIEF DESCRIPTION OF THE DRAWINGS

Embodiments of the disclosure are illustrated by way of example and not limitation in the figures of the accompanying drawings in which like references indicate similar elements.

FIGS. 8A-8C illustrate an example of a search process of a multi-layer grid searching algorithm according to one embodiment.

DETAILED DESCRIPTION

Figure 1:
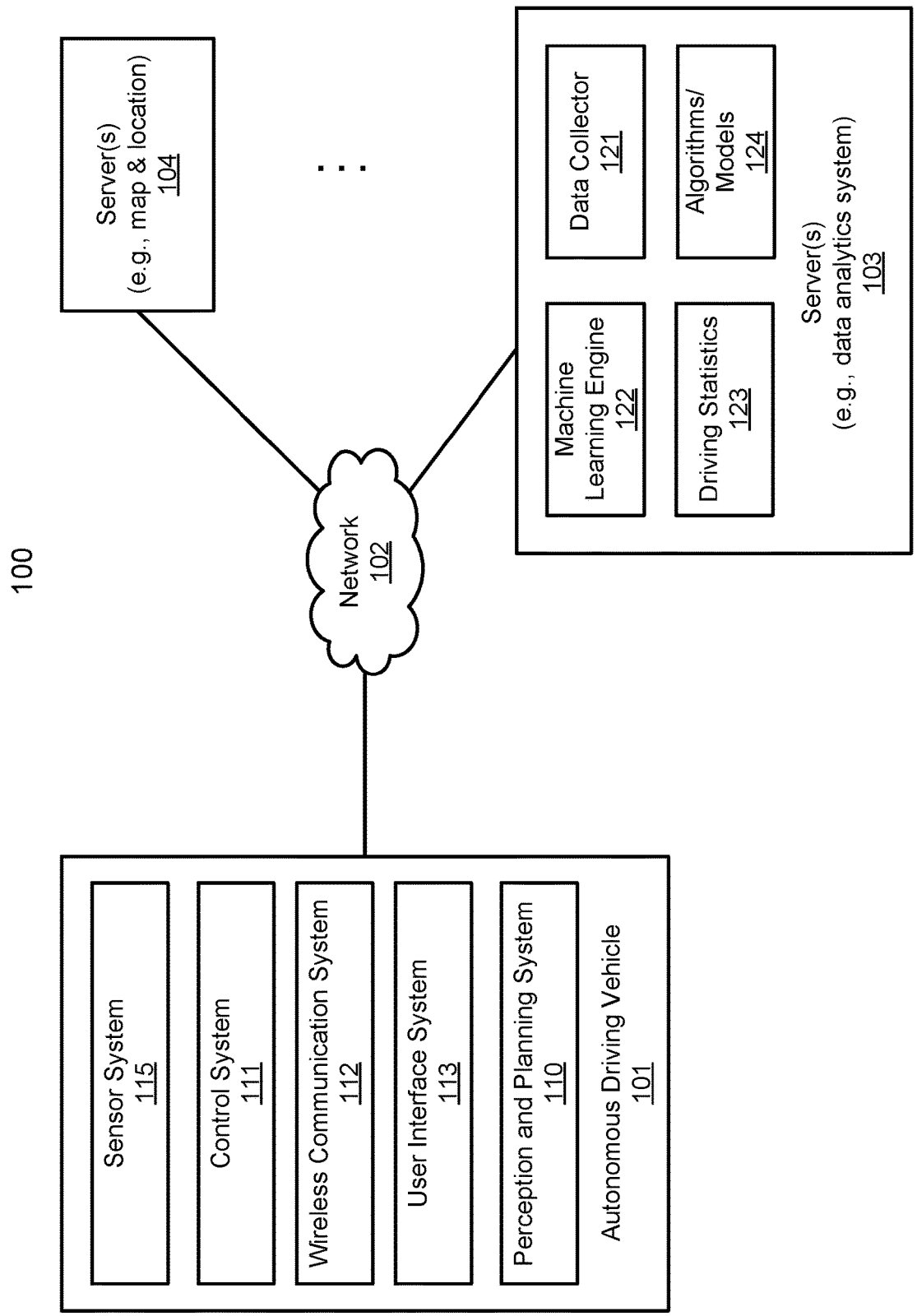
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method of path planning using a multi-layer grid searching algorithm to position an ADV in a target position is disclosed. In conventional searching algorithm, if a position is reached, the position will not be able to be reached again. The multi-layer grid searching algorithm include multiple layer grids, for example, a first layer grid and a second layer grid. The first layer grid includes a first set of nodes. The second layer grid includes a second set of nodes corresponding to at least a portion of the first set of nodes. Each node of the first set of nodes represents a position in an open space in which the target position is located, and each corresponding node of the second set of nodes represents the same position in the open space. In this way, a position in the open space is allowed to be reached twice by selecting a first corresponding node in the first set of nodes once and selecting a second corresponding node in the second set of nodes once.

According to one embodiment, path planning is performed using a multi-layer grid searching algorithm to position an ADV in a target position. A first layer grid including a first set of one or more nodes is defined, where the first layer grid represents an open space in which the target position is located. A second layer grid is defined. The second layer grid includes a second set of one or more nodes corresponding to at least a portion of the first set of one or more nodes. From a start node until a goal node, following operations are iteratively performed. A set of next node candidates are identified by searching in the first set of one or more nodes and the second set of one or more nodes. For each next node candidate of the set of next node candidates, a cost is determined using a cost function. A next node having a lowest cost is selected from the set of next node candidates based on their respective costs. A path trajectory of the ADV is generated based on the start node, the selected nodes and the goal node to control the ADV to position the ADV at the target position autonomously according to the path trajectory.

In one embodiment, each node of the first set of one or more nodes represents a position in the open space, and each corresponding node of the second set of one or more nodes represents the same position in the open space. In one embodiment, each node of the first set of one or more nodes or the second set of one or more nodes is allowed to be selected only once. In one embodiment, a position in the open space is allowed to be reached twice by selecting a first node in the first set of one or more nodes once and selecting a second node in the second set of one or more nodes once.

In one embodiment, a cost associated with a backward movement to the target position is determined to be negative. In one embodiment, the second set of one or more nodes includes only one or more nodes corresponding to an interested area in the open space. In one embodiment, the multi-layer grid searching algorithm is a multi-layer grid A-star searching algorithm. In one embodiment, the multi-layer grid searching algorithm is a two-layer grid A-star searching algorithm.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
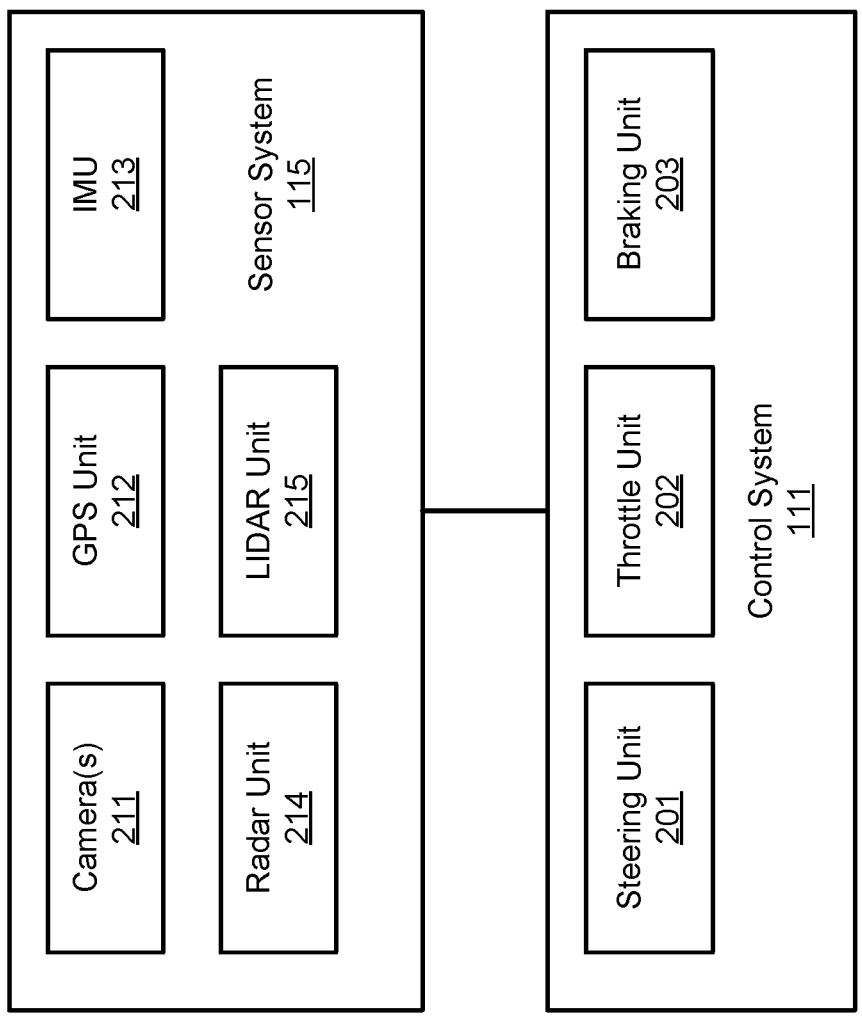
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to perform path planning using a multi-layer grid searching algorithm to position the ADV in a target position, which may include an algorithm or model to define a first layer grid including a first set of one or more nodes, an algorithm or model to define a second layer grid including a second set of one or more nodes, an algorithm or model to search in the first set of one or more nodes and the second set of one or more nodes to identify a set of next node candidates, an algorithm or model to determine a cost using a cost function, an algorithm or model to select a next node having a lowest cost. Algorithms 124 may include an algorithm or model to generate a path trajectory of the ADV.

Algorithms 124 can then be uploaded on ADVs to be utilized during autonomous driving in real-time.

Figure 3A:
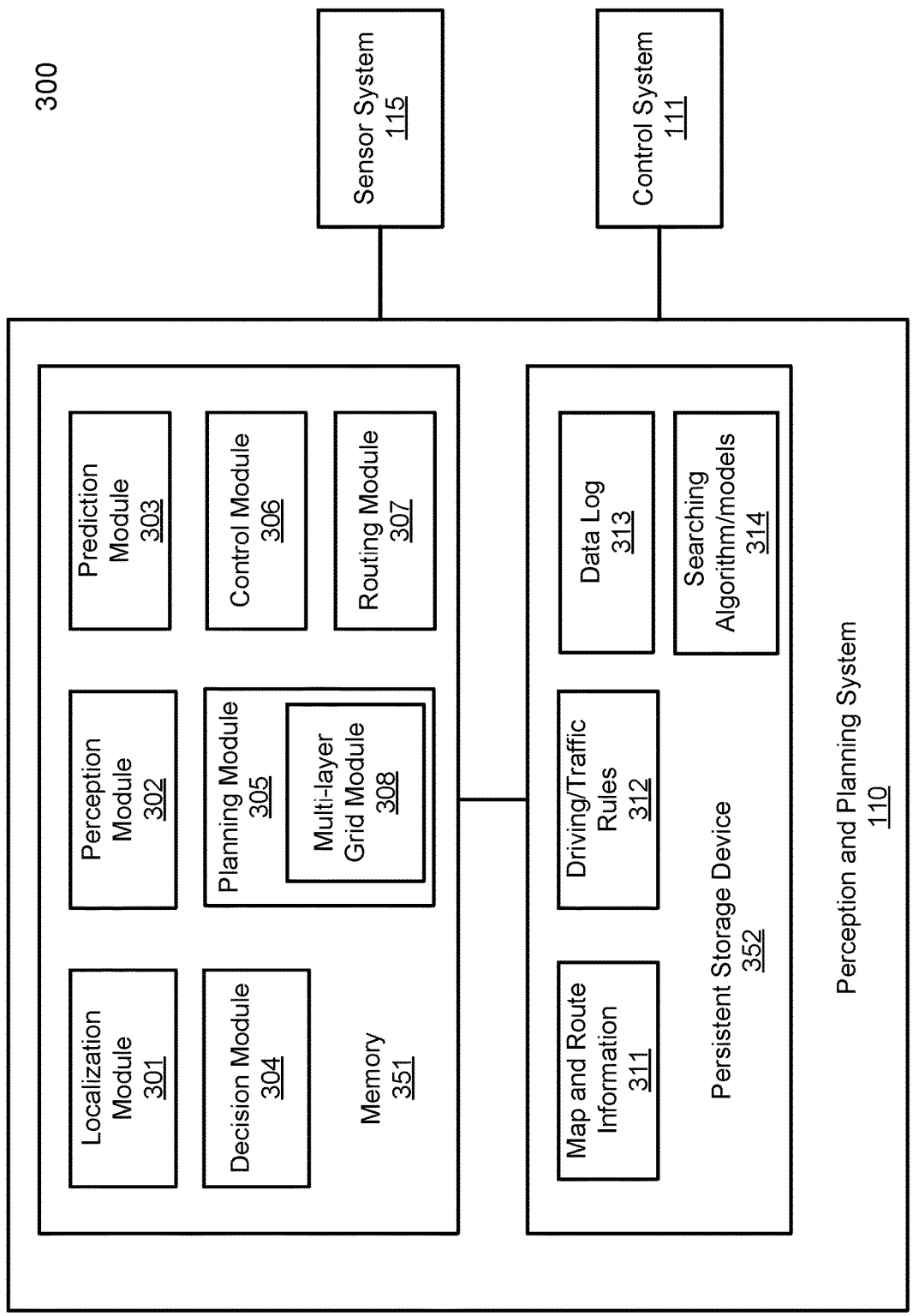
FIGS. 3A-3B are block diagrams illustrating an example of a perception and planning system used with an autonomous vehicle according to one embodiment.
Figure 3B:
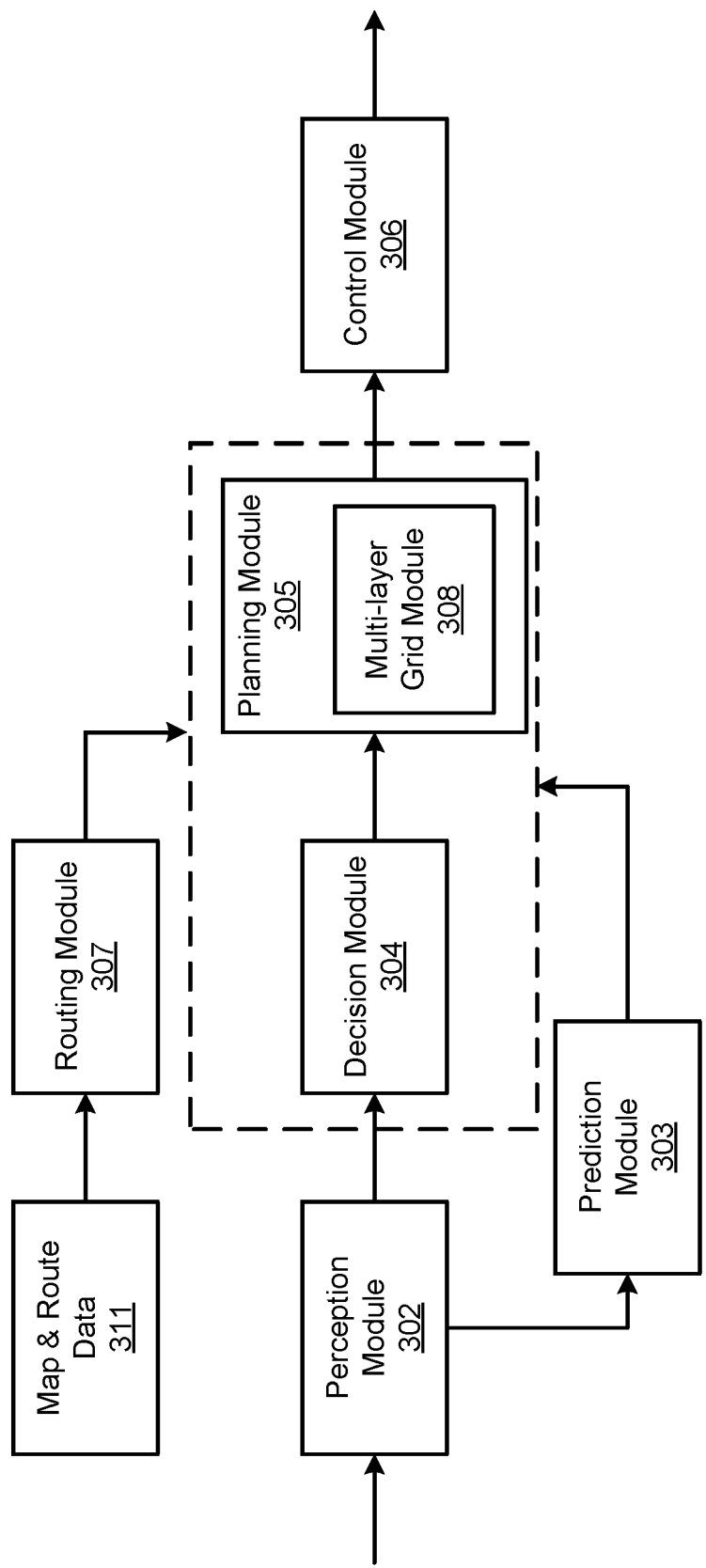

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307 and multi-layer grid module 308

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Although not shown, perception and planning system 110 further includes a data logger or data collector configured to collect data processed by the components 301-308 and sensors over a period of time, which may be stored as a part of data log 313. For example, data log 313 includes any prediction, decision, and paths planned or made in each of the driving/planning cycle. Data log 313 may further include control commands issued and the responses or states (e.g., speed, acceleration, heading, locations, etc.) of the vehicle captured at different points in time during each driving cycle. Data log 313 may be utilized for planning and controlling the vehicle subsequently or alternatively, data log 313 may be analyzed offline for improving the driving algorithms or predictive models. Perception and planning system 110 further includes a searching algorithm/models 314 to store searching algorithm/models.

According to one embodiment, planning module 305 includes multi-layer grid module 308, which is configured to perform path planning using a multi-layer grid searching algorithm to position an ADV in a target position, for example, in an open space. Multi-layer grid module 308 is further configured to generate a path trajectory of the ADV to control the ADV to position the ADV at the target position autonomously according to the path trajectory.

Figure 4:
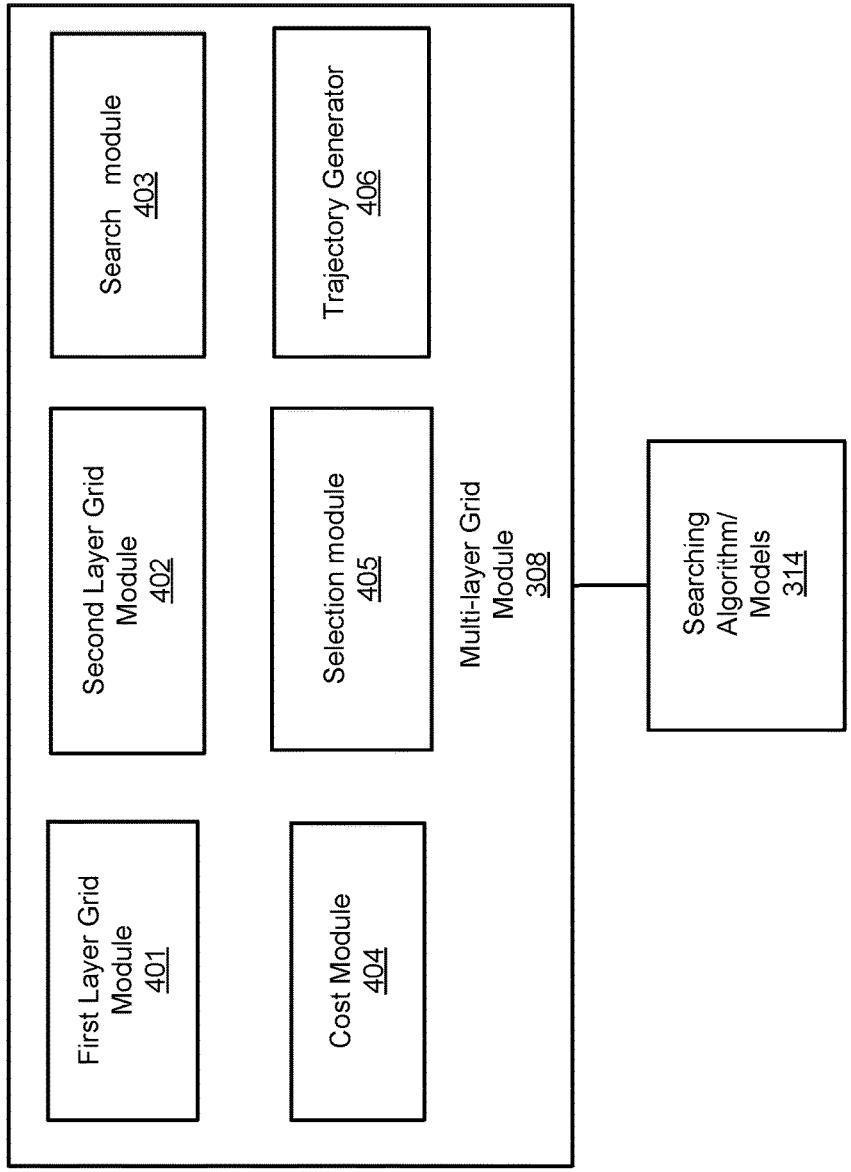
FIG. 4 is a block diagram illustrating an example of a multi-layer grid module.
Figure 5:
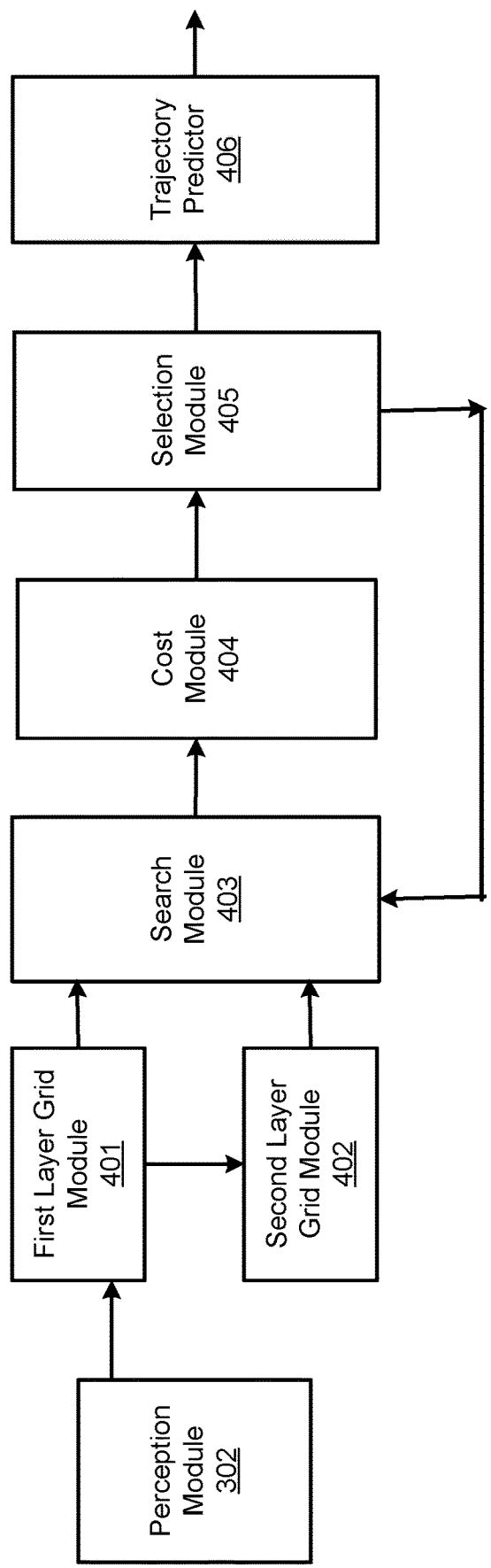
FIG. 5 is a processing flow diagram of a multi-layer grid module according to one embodiment.

FIG. 4 is a block diagram 400 illustrating an example of multi-layer grid module 308. FIG. 5 is a processing flow diagram 500 of multi-layer grid module 308 according to one embodiment. Referring to FIG. 4 and FIG. 5, multi-layer grid module 308 includes, but is not limited to, first-layer grid module 401, second-layer grid module 402, search module 403, and cost module 404, selection module 405 and trajectory generator 406, which work together using searching algorithms or models 314 to control the ADV to position the ADV at a target position autonomously according to the path trajectory. Note that modules 401-406 may be integrated into fewer number of modules or a single module.

According to one embodiment, multi-layer grid module 308 is configured to perform path planning using a multi-layer grid searching algorithm to position the ADV in the target position. A first layer grid including a first set of one or more nodes is defined by first-layer grid module 401, where the first layer grid represents an open space in which the target position is located. A second layer grid is defined by second-layer grid module 402. The second layer grid includes a second set of one or more nodes corresponding to at least a portion of the first set of one or more nodes. From a start node until a stop node, following operations are iteratively performed. A set of next node candidates are identified by searching in the first set of one or more nodes and the second set of one or more nodes by search module 403. Next, for each next node candidate of the set of next node candidates, a cost is determined using a cost function by cost module 404. Thereafter, a next node having a lowest cost is selected from the set of next node candidates based on their respective costs by selection module 405. Finally, trajectory generator 406 is configured to generate a path trajectory of the ADV based on the start node, the selected nodes and the stop node to control the ADV to position the ADV at the target position autonomously according to the path trajectory.

In one embodiment, each node of the first set of one or more nodes in first-layer grid module 401 represents a position in the open space, and each corresponding node of the second set of one or more nodes in second-layer grid module 402 represents the same position in the open space. Thus, a position in the open space is allowed to be reached twice by selecting a first node in the first set of one or more nodes in first-layer grid module 401 once and selecting a second node in the second set of one or more nodes in second-layer grid module 402 once.

Figure 6:
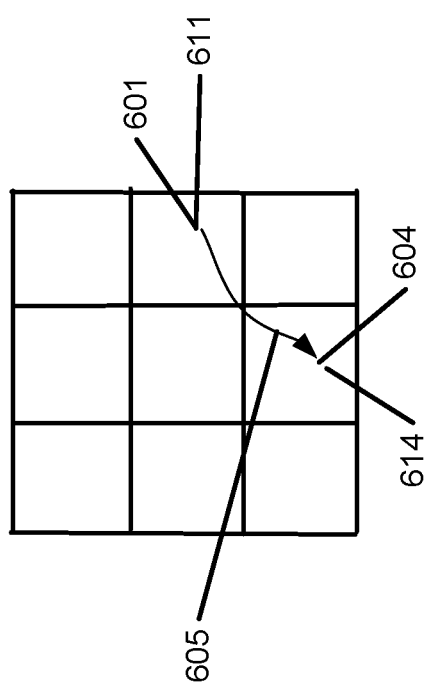
FIG. 6 illustrate a searching algorithm to position an ADV in a target position.

FIG. 6 illustrate a searching algorithm to position an ADV in a target position. For example, the searching algorithm may be A-star searching algorithm. A-star (A*) searching algorithm is an informed search algorithm. Starting from a starting node of a graph, A-star aims to find a path to a goal node having the smallest cost (least distance travelled, shortest time, etc.). A-star does this by maintaining a tree of paths originating at the start node and extending those paths one edge at a time until its termination criterion is satisfied. At each iteration of its main loop, A-star determines which of its paths to extend based on the cost of the path and an estimate of the cost required to extend the path all the way to the goal node. Specifically, A-star selects the path that minimizes $$f(n)=g(n)+h(n)$$

where n is a next node on the path, g(n) is the cost of the path from the start node to n node, and h(n) is a heuristic function that estimates the cost of the shortest path from n to the goal node. A-star terminates when the path it chooses to extend is a path from the start node to the goal node or if there are no paths eligible to be extended. The heuristic function is problem-specific.

When parking to a parking slot, A-star searching algorithm may be used to find a solution to a parking position. As illustrated in FIG. 6, the start node is 601, and the goal node is 604. A-star searching algorithm may find a path 605 from the start node is 601 to the goal node 604 having the smallest cost, e.g., least distance travelled.

However, A-star searching algorithm may give the solution where a last step is a backward movement with a curve, which may result in a control error, and sometimes may not be acceptable (e.g. remote charging). A-star searching algorithm, if a node is being reached, the node is not allowed to be reached again, which limits options for path planning in certain scenarios. There may be a need to develop a multi-layer grid searching algorithm to perform path planning, such that each node or grid cell in the A* search space can be searched multiple times to accommodate back and forth planning of the vehicle in an open space.

FIGS. 7A-7D illustrate a multi-layer grid searching algorithm to position an ADV in a target position 714 according to one embodiment. The multi-layer grid searching algorithm may be used to perform path planning to position the ADV in the target position 714. The multi-layer grid searching algorithm include a multi-layer grid 700c, which include multiple layers of grids, for example, a first layer grid 700a and a second layer grid 700b.

Figure 7B:
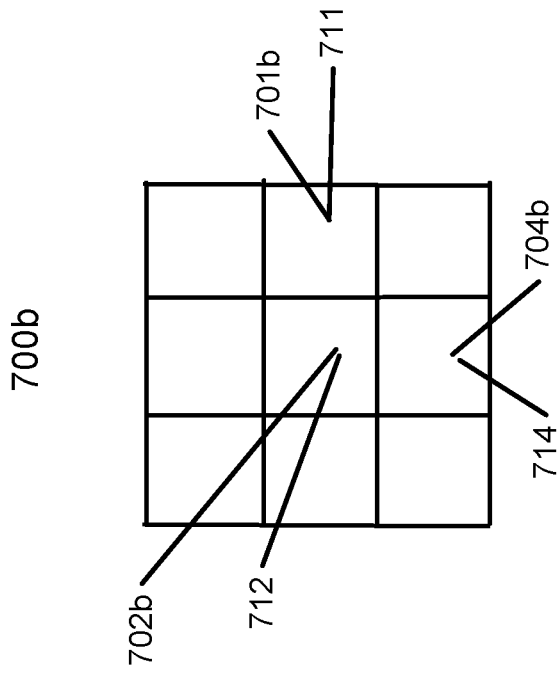
FIGS. 7A-7D illustrate a multi-layer grid searching algorithm to position an ADV in a target position according to one embodiment.
Figure 7A:
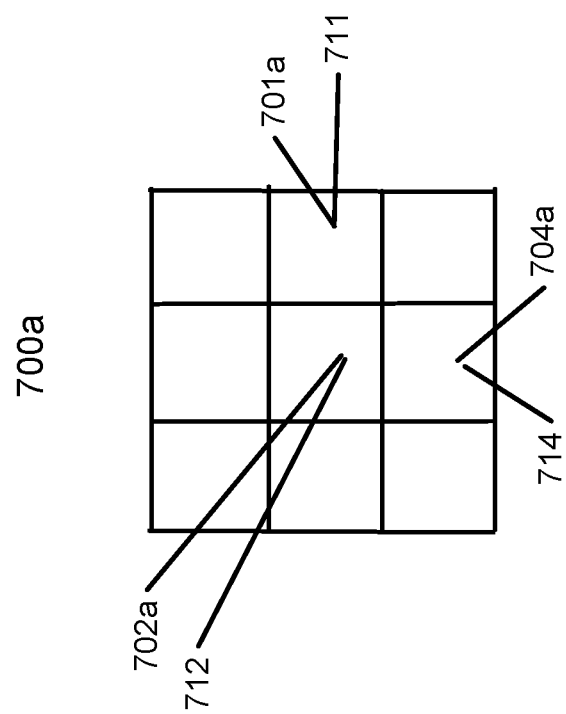

FIG. 7A illustrates the first layer grid 700a. The first layer grid 700a includes a first set of one or more nodes (e.g., 701a, 702a, 704a). The first layer grid 700a represents an open space in which the target position 714 is located. Each node of the first set of nodes (e.g., 701a, 702a, 704a) represents a position (e.g., 711, 712, 714) in the open space in which the target position 714 is located.

FIG. 7B illustrates the second layer grid 700b. The second layer grid 700b includes a second set of one or more nodes (e.g., 701b, 702b, 704b). The second layer grid 700b also represents the open space in which the target position 714 is located. Each node of the second set of nodes (e.g., 701b, 702b, 704b) represents the position (e.g., 711, 712, 714) in the open space in which the target position 714 is located.

Figure 7D:
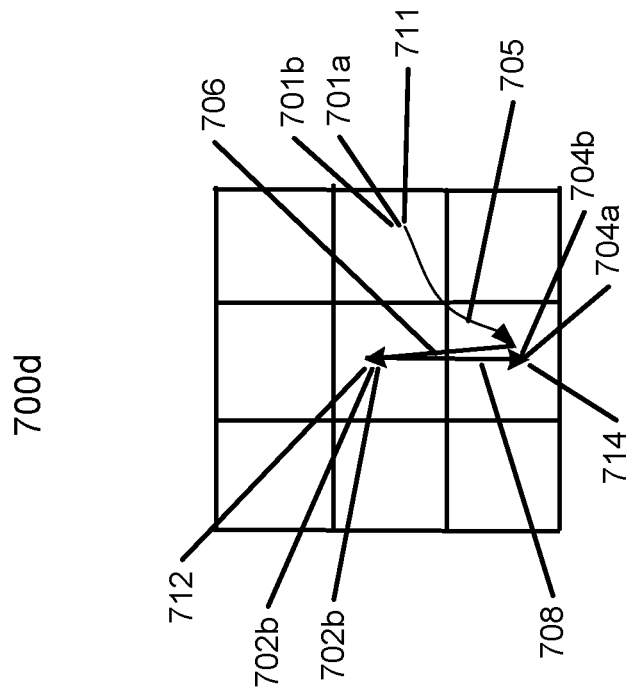
Figure 7C:
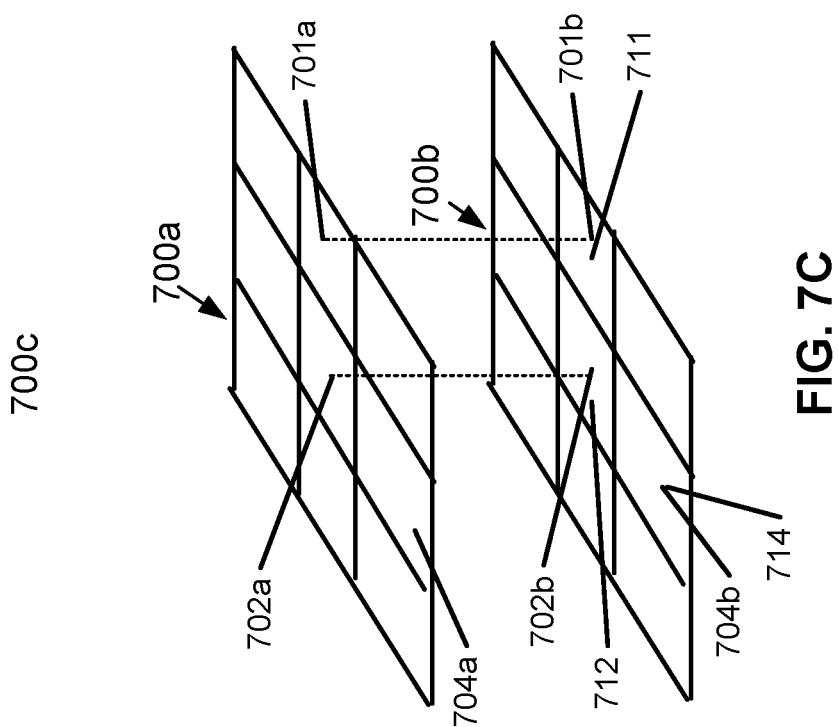

FIG. 7C illustrates the multi-layer grid 700c including the first layer grid 700a and the second layer grid 700b. Referring to FIG. 7A, FIG. 7B and FIG. 7C, the second set of one or more nodes (e.g., 701b, 702b, 704b) in the second layer grid 700b may correspond to at least a portion of the first set of one or more nodes (e.g., 701a, 702a, 704a) in the first layer grid 700a. For example, node 704b in the second set of nodes corresponds to node 704a in the first set of nodes.

In one embodiment, the second layer grid 700b may overlap at least a portion of the first layer grid 700a. As illustrated in FIGS. 7A-7C, each node of the first set of one or more nodes (e.g., 701a, 702a, 704a) represents a position (e.g., 711, 712, 714) in the open space, and wherein each corresponding node of the second set of one or more nodes (e.g., 701b, 702b, 704b) represents the same position (e.g., 711, 712, 714) in the open space. For example, node 704b in the second set of nodes and the corresponding node 704a in the first set of nodes represent the same target position 714.

In one embodiment, the second set of one or more nodes may include only one or more nodes corresponding to an interested area in the open space. For example, the interested area may be the target position 714.

In the multi-layer grid searching algorithm, each node of the first set of one or more nodes (e.g., 701a, 702a, 704a) or the second set of one or more nodes (e.g., 701b, 702b, 704b) is allowed to be selected only once. Because there are multiple layers of grids, a position in the open space may have multiple corresponding nodes in the multiple sets of nodes in the multiple layers of grids respectively. Thus, a position in the open space may be allowed to be reached twice by selecting a first corresponding node in the first set of one or more nodes once and selecting a second corresponding node in the second set of one or more nodes once. For example, the target position 714 has a first corresponding node 704a in the first set of nodes in the first layer grid 700a and a second corresponding node 704b in the second set of nodes in the second layer grid 700b. Therefore, the target position 714 in the open space is allowed to be reached twice by selecting the first corresponding node 704a in the first set of one or more nodes once and selecting a second corresponding node 704b in the second set of one or more nodes once.

FIG. 7D illustrates a solution 700d of the multi-layer grid searching algorithm. Because the target position 714 in the open space is allowed to be reached twice, the multi-layer grid searching algorithm may give a solution 700d as illustrated in FIG. 7D. In this solution, at first, the ADV moves from a start position 711 to the target position 714 in a path 705. However, the path 705 has a curve, which is difficult for a control module of the ADV to follow and may result in a control error. To solve this problem, the ADV moves forward from the target position 714 to a position 712 in a path 706. Then, the ADV moves backward from the position 712 to the target position 714, but in a straight line in a path 708. When moving backward, a straight line trajectory is easier for an ADV to follow than a curved trajectory. Because the path 708 is a straight line, it is easier for the control module of the ADV to follow. Thus, a control error may be avoided or reduced. Therefore, the ADV may be controlled with higher accuracy.

In order to implement the multi-layer grid searching algorithm, in addition to have the multi-layer grid, cost function may also be specifically defined or determined. For example, for a movement backward to the target position, a corresponding edge may receive a negative cost. In one embodiment, the cost associated with the backward movement to the target position is determined to be negative. The negative cost may be reasonably large, such that the trajectory with the path 705 to the path 706 to the path 708 is possible.

FIGS. 8A-8C illustrate an example of a search process of the multi-layer grid searching algorithm according to one embodiment. The start position is position 711, and the target position is position 714. In this example, the search process starts from the target position 714 and searches backward to the start position 711. The start node is 704a, and the goal node is 701a or 701b.

The search operations are iteratively performed from the start node 704a until the goal node 701a or 701b. A set of next node candidates are identified in searching in the first set of one or more nodes (e.g., 701a, 702a, 703a) in the first layer grid 700a and the second set of one or more nodes (e.g., 701b, 702b, 703b) in the second layer grid 700b. Referring to FIG. 8A, starting from node 704a, a set of next node candidates are identified. For example, node 701a, node 702a and node 703a may be identified. Next, for each next node candidate of the set of next node candidates, a cost is determined using a cost function. For example, the cost function may be $$f(n)=g(n)+h(n)$$

where n is a next node on the path, g(n) is the cost of the path from the start node to n node, and h(n) is a heuristic function that estimates the cost of the shortest path from n to the goal node. A next node having a lowest cost is selected from the set of next node candidates based on their respective costs. For example, a next node after the start node may be node 702a based on a cost associated with a path 708'.

In order to encourage a backward movement to the target position 714 with a straight line, an edge associated with the backward movement to the target position 714 may be determined to have a negative cost, and the negative cost may be reasonably large. For example, an edge associated with the backward movement may be determined to have a cost of "-2". As illustrated in FIG. 8B, when the ADV moves from the node 702a to the node 704b, an associated edge may receive a cost of "-2". In this way, node 704b may be selected as the next node in a path 706'. Thereafter, the goal node 701b is selected in a path 705' as illustrated in FIG. 8C. By this multi-layer searching algorithm, the trajectory including paths 705', 706' and 708' are generated.

Figure 9:
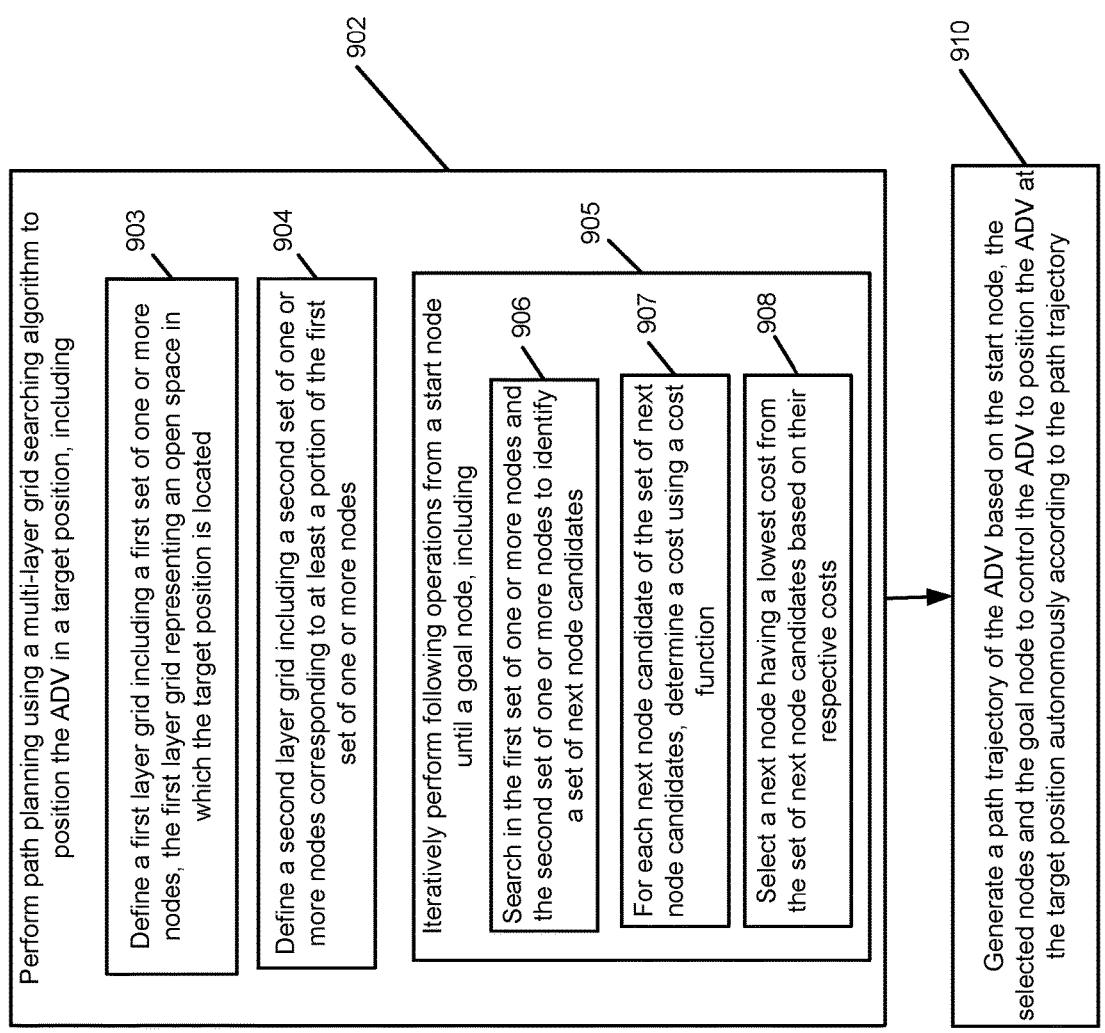
FIG. 9 is a flow diagram illustrating an example of a process for path planning using a multi-layer grid searching algorithm to position an ADV in a target position according to one embodiment.

FIG. 9 is a flow diagram illustrating an example of a process 900 for path planning using a multi-layer grid searching algorithm to position an ADV in a target position according to one embodiment. Process 900 may be performed by processing logic which may include software, hardware, or a combination thereof. For example, process 900 may be performed by planning module 305. Referring to FIG. 9, in operation 902, processing logic performs path planning using a multi-layer grid searching algorithm to position the ADV in a target position. Operation 902 includes operations 903-908. In operation 903, processing logic defines a first layer grid including a first set of one or more nodes, the first layer grid representing an open space in which the target position is located. In operation 904, processing logic defines a second layer grid including a second set of one or more nodes corresponding to at least a portion of the first set of one or more nodes. In operation 905, processing logic iteratively performs operations 906-908 from a start node until a goal node. In operation 906, processing logic searches in the first set of one or more nodes and the second set of one or more nodes to identify a set of next node candidates. In operation 907, for each next node candidate of the set of next node candidates, processing logic determines a cost using a cost function. In operation 908, processing logic selects a next node having a lowest cost from the set of next node candidates based on their respective costs. In operation 910, processing logic generates a path trajectory of the ADV based on the start node, the selected nodes and the goal node to control the ADV to position the ADV at the target position autonomously according to the path trajectory.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    performing path planning using a multi-layer grid searching algorithm that is unable to reach a single position twice on one grid, to position the ADV in a target position, including,
        defining a first layer grid including a first set of one or more nodes, the first layer grid representing an open space in which the target position is located,
        defining a second layer grid including a second set of one or more nodes corresponding to at least a portion of the first set of one or more nodes,
        iteratively performing following operations from a start node until a goal node, including
            searching in the first set of one or more nodes and the second set of one or more nodes to identify a set of next node candidates,
            for each next node candidate of the set of next node candidates, determining a cost using a cost function, and
            selecting a next node having a lowest cost from the set of next node candidates based on their respective costs,
            wherein the multi-layer grid searching algorithm reaches a position in the open space twice by selecting a first corresponding node in the first set of one or more nodes once and by selecting a second corresponding node in the second set of one or more nodes once; and
    generating a path trajectory of the ADV based on the start node, the selected nodes and the goal node to control the ADV to position the ADV at the target position autonomously according to the path trajectory.

2. The method of claim 1, wherein each node of the first set of one or more nodes represents a position in the open space, and wherein each corresponding node of the second set of one or more nodes represents the same position in the open space.

3. The method of claim 1, wherein each node of the first set of one or more nodes or the second set of one or more nodes is allowed to be selected only once.

4. The method of claim 1, wherein the target position is a parking position.

5. The method of claim 1, wherein a cost associated with a backward movement to the target position is determined to be negative.

6. The method of claim 1, wherein the second set of one or more nodes includes only one or more nodes corresponding to an interested area in the open space.

7. The method of claim 1, wherein the multi-layer grid searching algorithm is a multi-layer grid A-star searching algorithm.

8. A non-transitory machine-readable medium having instructions stored therein, which when executed by a processor, cause the processor to perform operations, the operations comprising:
    performing path planning using a multi-layer grid searching algorithm that is unable to reach a single position twice on one grid, to position the ADV in a target position, including,
        defining a first layer grid including a first set of one or more nodes, the first layer grid representing an open space in which the target position is located,
        defining a second layer grid including a second set of one or more nodes corresponding to at least a portion of the first set of one or more nodes,
        iteratively performing following operations from a start node until a goal node, including
            searching in the first set of one or more nodes and the second set of one or more nodes to identify a set of next node candidates,
            for each next node candidate of the set of next node candidates, determining a cost using a cost function, and
            selecting a next node having a lowest cost from the set of next node candidates based on their respective costs,
            wherein the multi-layer grid searching algorithm reaches a position in the open space twice by selecting a first corresponding node in the first set of one or more nodes once and selecting a second corresponding node in the second set of one or more nodes once; and generating a path trajectory of the ADV based on the start node, the selected nodes and the goal node to control the ADV to position the ADV at the target position autonomously according to the path trajectory.

9. The machine-readable medium of claim 8, wherein each node of the first set of one or more nodes represents a position in the open space, and wherein each corresponding node of the second set of one or more nodes represents the same position in the open space.

10. The machine-readable medium of claim 8, wherein each node of the first set of one or more nodes or the second set of one or more nodes is allowed to be selected only once.

11. The machine-readable medium of claim 8, wherein the target position is a parking position.

12. The machine-readable medium of claim 8, wherein a cost associated with a backward movement to the target position is determined to be negative.

13. The machine-readable medium of claim 8, wherein the second set of one or more nodes includes only one or more nodes corresponding to an interested area in the open space.

14. The machine-readable medium of claim 8, wherein the multi-layer grid searching algorithm is a multi-layer grid A-star searching algorithm.

15. A data processing system, comprising:
a processor; and
a memory coupled to the processor to store instructions, which when executed by the processor, cause the processor to perform operations, the operations including
performing path planning using a multi-layer grid searching algorithm to position the ADV in a target position, including,
defining a first layer grid including a first set of one or more nodes, the first layer grid representing an open space in which the target position is located,
defining a second layer grid including a second set of one or more nodes corresponding to at least a portion of the first set of one or more nodes,
iteratively performing following operations from a start node until a goal node, including
searching in the first set of one or more nodes and the second set of one or more nodes to identify a set of next node candidates,
for each next node candidate of the set of next node candidates, determining a cost using a cost function, and
selecting a next node having a lowest cost from the set of next node candidates based on their respective costs,
wherein a position in the open space is allowed to be reached twice by selecting a first corresponding node in the first set of one or more nodes once and selecting a second corresponding node in the second set of one or more nodes once; and
generating a path trajectory of the ADV based on the start node, the selected nodes and the goal node to control the ADV to position the ADV at the target position autonomously according to the path trajectory.

16. The system of claim 15, wherein each node of the first set of one or more nodes represents a position in the open space, and wherein each corresponding node of the second set of one or more nodes represents the same position in the open space.

17. The system of claim 15, wherein each node of the first set of one or more nodes or the second set of one or more nodes is allowed to be selected only once.

18. The system of claim 15, wherein the target position is a parking position.

19. The system of claim 15, wherein a cost associated with a backward movement to the target position is determined to be negative.

20. The system of claim 15, wherein the second set of one or more nodes includes only one or more nodes corresponding to an interested area in the open space.

21. The system of claim 15, wherein the multi-layer grid searching algorithm is a multi-layer grid A-star searching algorithm.

* * * * *